Figure 1:
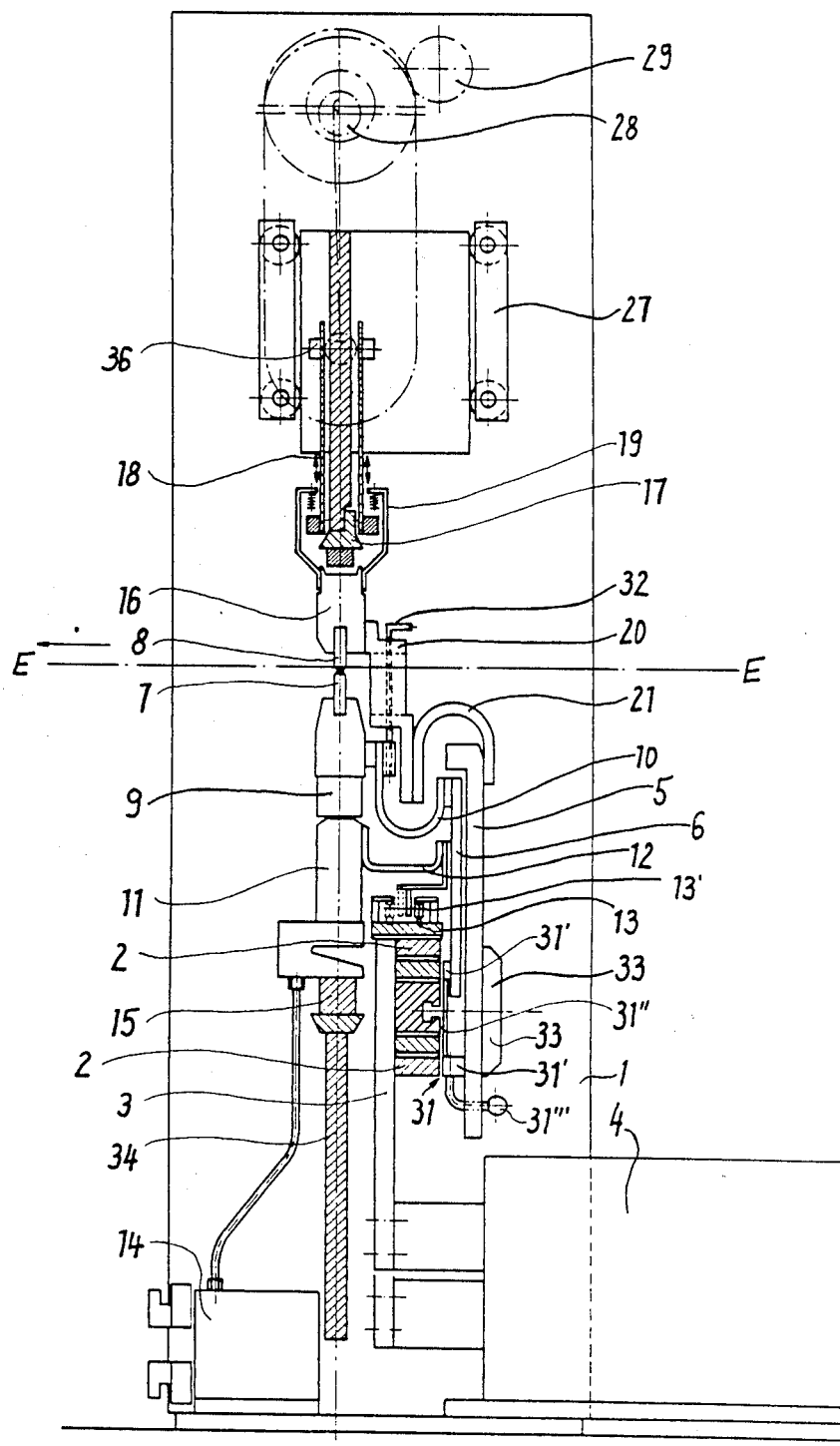

United States Patent [19]

Ritter et al.

[11] Patent Number: 4,940,874
[45] Date of Patent: Jul. 10, 1990

[54] CONVERTIBLE SINGLE OR DOUBLE SPOT WELDING MACHINE

[75] Inventors: Gerhard Ritter; Klaus Ritter; Rudolf Scherr; Kurt Jursche, all of Graz, Austria

[73] Assignee: EVG Entwicklungs-u.Verwertungs-Gesellschaft m.b.H., Graz, Austria

[21] Appl. No.: 326,915

[22] Filed: Mar. 22, 1989

[30] Foreign Application Priority Data

Mar. 31, 1988 [AT] Austria ................................ 860/88

[51] Int. Cl.⁵ ............................................. B23K 11/10
[52] U.S. Cl. ...................................... 219/87; 219/56
[58] Field of Search .................................... 219/87, 56

[56] References Cited

U.S. PATENT DOCUMENTS

| 2,474,593 | 6/1949 | Putnam | 219/87 |
| 2,481,844 | 9/1949 | Johnson | 219/87 |
| 3,139,504 | 6/1964 | Ramstein | 219/87 |
| 4,523,075 | 6/1985 | Horii | 219/87 |

FOREIGN PATENT DOCUMENTS

| 236746 | 11/1964 | Austria . | |
| 292427 | 8/1971 | Austria . | |
| 308501 | 7/1973 | Austria . | |
| 365492 | 1/1982 | Austria . | |
| 0187277 | 7/1986 | European Pat. Off. . | |
| 83053 | 5/1971 | German Democratic Rep. | ... 219/87 |

Primary Examiner—Clifford C. Shaw
Attorney, Agent, or Firm—Marmorek, Guttman & Rubenstein

[57] ABSTRACT

A convertible single or double spot welding machine operating by the electrical resistance method for producing grids or bar grates by single spot welding or double spot welding, has a transverse row of electrodes and at least one welding transformer on one side of the welding plane. Electrically conductive connections, which pass through the welding plane, connect the welding transformer to the electrodes located on the other side of the welding plane and close the welding current circuit for single spot welding. In order to convert from single spot welding to double spot welding, the connections which pass through the welding plane are removed, selected electrodes on the side of the welding plane remote from the welding transformer are connected in pairs by current bridges, and the supply lines from the welding transformer are respectively connected to the two electrodes opposite the electrodes connected by the current bridges.

17 Claims, 3 Drawing Sheets

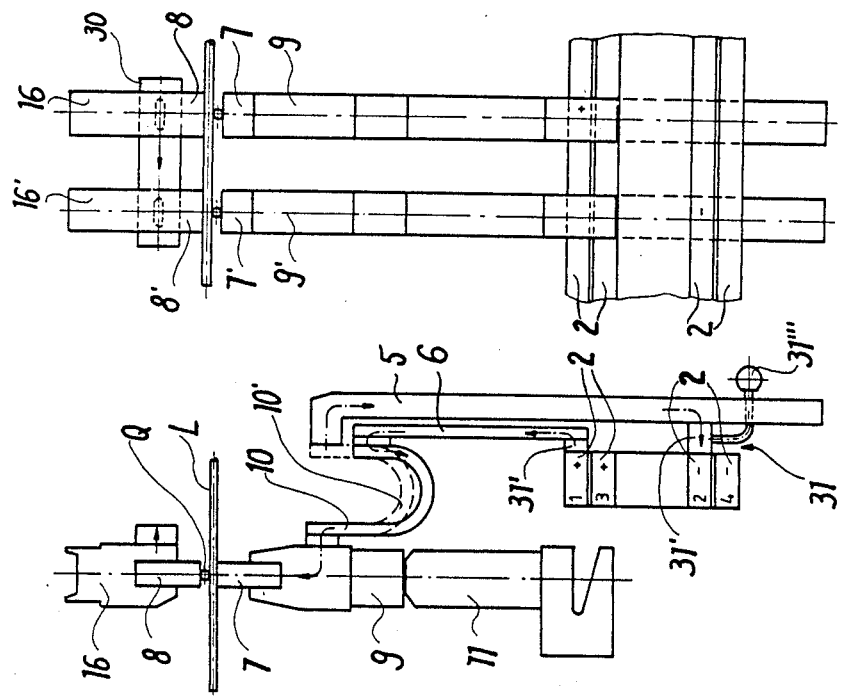
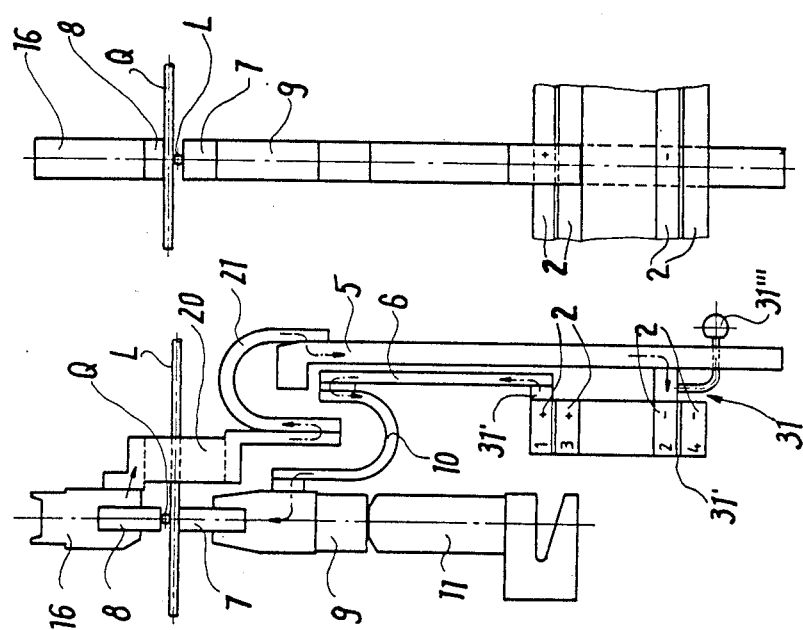
Fig. 3a  Fig. 3b  Fig. 4a  Fig. 4b

CONVERTIBLE SINGLE OR DOUBLE SPOT WELDING MACHINE

The invention relates to a multiple spot welding machine operating by the electrical resistance method for producing grids or bar grates, having a transverse row of electrodes on each of the two sides of the welding plane and at least one welding transformer on one side of said plane, electrically conductive connections which pass through the welding plane being provided from the welding transformer to the electrodes located on the side of the welding plane remote therefrom and it being possible to make single spot welding paths or double spot welding paths selectively through the electrodes.

In a welding machine of this generic type which is known from AT-PS 365,492 and which serves to produce grids with different mesh aperture, transverse rows of stationary electrodes are arranged on both sides of the welding plane. The interval of the electrodes then corresponds to the smallest possible mesh aperture.

In the known machine the variation of the mesh aperture, starting from single spot welding for the smallest mesh aperture, is effected by a changeover to double spot welding for mesh apertures which are a multiple of the smallest mesh aperture, by pure methods of circuit technology, the rigid connections passing permanently through the welding plane, so that only a group of longitudinal wires can be introduced between the electrodes in the longitudinal wire feed direction, but not prefabricated frames, as is desired if frame grids or bar grates are to be produced.

The object of the present invention is to develop a welding machine of the generic type initially stated which permits great flexibility as to different combinations of diameter of longitudinal and transverse wires and wire pitches in single spot welding in a structurally simple manner on the one hand, and on the other hand permits double spot welding with the known increased efficiency, but also permits the feeding of prefabricated frames, onto which wires are welded, in the case of double spot welding.

The machine according to the invention is characterized in that in order to change over from single spot welding to double spot welding the electrically conductive connections which pass through the welding plane are demountable, that selected electrodes on the side of the welding plane remote from the welding transformer are connectable in pairs by current bridges, and that the supply line from the welding transformer respectively to one of the two electrodes included by the current bridge in a double spot welding path and on the side of the welding plane facing the welding transformer is reversible.

The welding machine according to the invention permits the adaptation of the machine in a simple manner to different requirements, and particularly even the removal of the connections which pass through the welding plane, so that even prefabricated frames, possibly already welded to a group of wires, for example wire frames or profile frames and flat sheet metal frames, can be fed and welded to longitudinal and/or transverse wires.

In a preferred embodiment of the invention having electrode holders slidable to vary the pitch of the longitudinal wires in the transverse direction of the machine, electrode holders which support electrodes co-operating in pairs on both sides of the welding plane can be coupled mechanically to one another for common adjustment, preferably by a frictional engagement generated by a lowering of the upper electrode onto the lower electrode and/or a coupling element, one of the two electrode holders of each electrode pair comprising a demountable connecting piece which passes through the welding plane. The adjustment of the required pitch of the longitudinal wires and the demounting of the connections which pass through the welding plane is facilitated by this means.

According to a further feature of the invention the demountable connecting pieces have a rigid construction and are connected to the associated electrodes on the one hand, and each through a flexible conductor to associated current collectors of a bus-bar on the other hand. The electrodes arranged on the same side of the welding plane as the welding transformer are also preferably connected each by means of a flexible conductor to associated current collectors of a bus-bar. After the connecting piece which passes through the welding plane is demounted, each electrode on the side of the welding plane facing the welding transformer is advantageously connectable by means of the flexible conductor to a current collector of a bus-bar which is associated with an adjacent electrode on the same side of the welding plane.

According to a further development of the invention all the electrodes on the one side of the welding plane are adjustable in a direction at right angles to the welding plane in order to open the electrode gap and adjust the latter, and all the electrodes on the opposite side of the welding plane are adjustable in a direction at right angles to the welding plane in order to open the welding gap and to generate the welding pressure.

In the context of the invention the welding transformer and the bus-bars associated with it are advantageously arranged below the welding plane, and an electrode beam which supports the electrodes and/or electrode holders above the welding plane is adjustable, preferably by means of an eccentric, for the basic adjustment of the electrodes to a predetermined material thickness. In this case the upper electrode beam may further be raisable at each feed step of the machine and the electrodes preferably simultaneously lowerable below the welding plane in order to permit a transverse wire feed both on the upper side and also on the lower side of the group of longitudinal wires.

According to another feature of the invention the electrode holders of one of the two rows of electrodes, or the electrode holders coupled in pairs are mounted transportably on a rail oriented in the transverse direction of the machine. In this case it is found advantageous if two parallel rails are provided and if electrode holders adjacent to each other in the transverse direction are alternately transportable on one of the rails.

Figure 2:
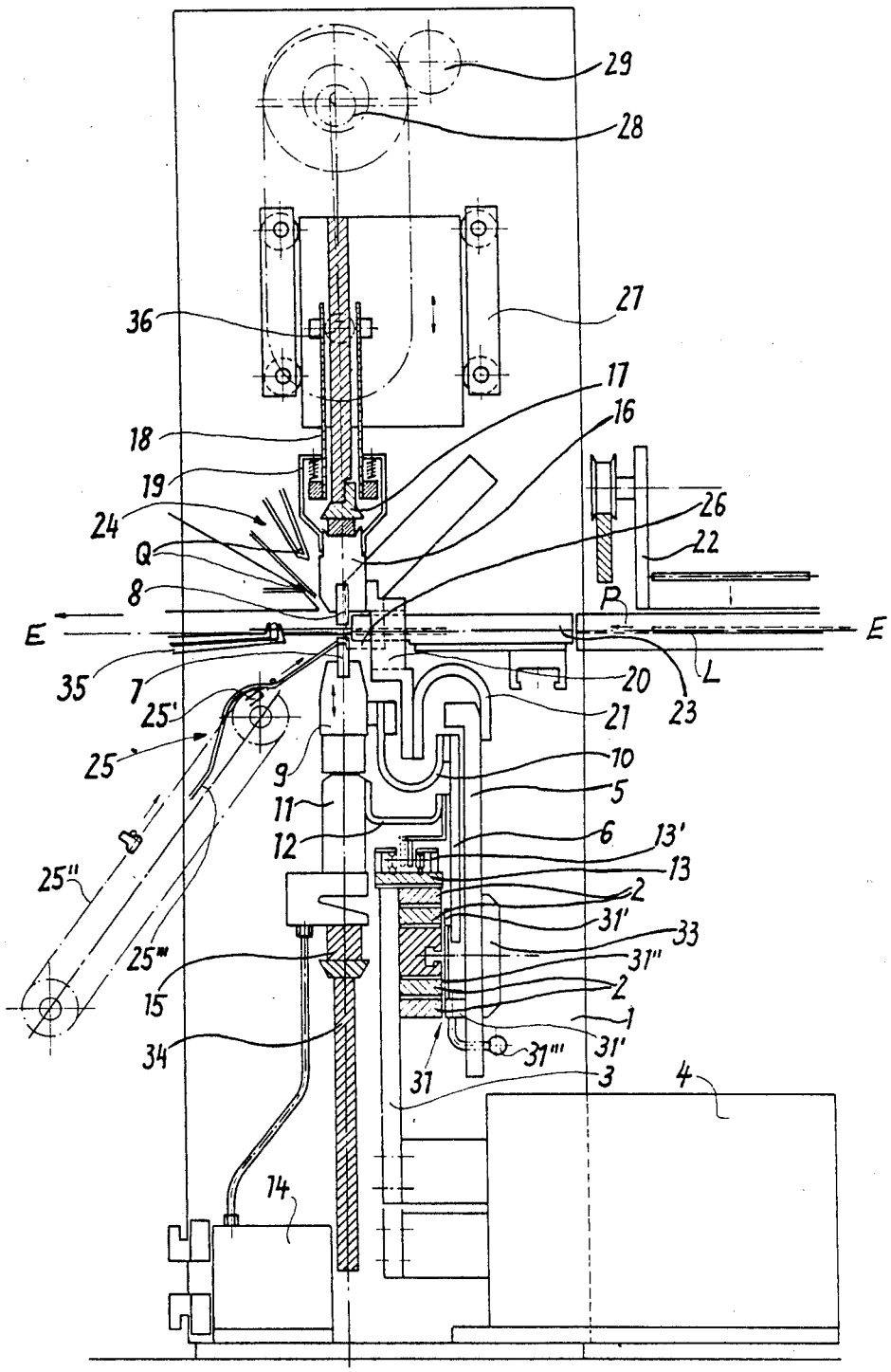

The invention and further features of it will be explained more fully below with reference to an exemplary embodiment and to the drawing, in which FIG. 1 shows apartly sectioned diagrammatic side elevation of the entire electrode system of a welding machine according to the invention, in which the upper and lower electrodes occupy a coupling position which facilitates an electrode displacement for the purpose of varying the pitch of the longitudinal wires, FIG. 2 shows a similar side elevation, in which the electrodes occupy the welding position and the elevation is supplemented by the longitudinal and transverse wire feeders and by frame feeders, FIGS. 3a and 3b show in detail in a diagrammatic side elevation and in front elevation the adjustment of the machine for single spot welding, and FIGS. 4a and 4b show, in a similar side elevation and in front elevation, the changeover of the machine to double spot welding.

In the welding machine shown in FIGS. 1 and 2 the machine frame 1 supports four bus-bars 2 which are insulated electrically from each other and from the machine frame and arranged transversely to the feed direction of the longitudinal wires. The bus-bars 2 are connected by conductors 3 to at least one, but preferably a plurality of, associated welding transformers 4. Pairs of current collectors 5, 6 which are slidable along the bus-bars 2, each make contact with a bus-bar and are fixable in selected positions. These current collectors 5, 6 are connected to electrodes 7, 8 arranged in transverse rows on both sides of the welding plane E—E. The electrodes 7 located below the welding plane E—E are mounted in associated electrode holders 9, to each of which a flexible current strap 10 of the associated current collector 6 is fixed. Each electrode holder 9 is stressed on its underside by a vertical hydraulic cylinder 11 which is guided with transverse mobility by rollers 13' through a stirrup 12, to which the associated current collector 6 is also fastened electrically insulated, on a rail 13 fixed to the machine above the bus-bars 2 and parallel to the latter. The hydraulic cylinder 11 is connected to a hydraulic valve 14 and is braced firmly downwards on a slide rail 15 fixed to the frame.

The electrodes 8, which are arranged in a transverse row above the welding plane E—E, are mounted in electrode holders 16 which are retained firmly on an electrode beam 17 by a clamp jaw 18, movable in a vertical direction, and by resiliently pretensioned stirrups 19. The electrode holder 16 is connected by a rigid connecting piece 20, which passes through the welding plane E—E, to a flexible current strap 21 which is fastened to an associated current collector 5.

According to FIG. 2 the longitudinal wires L are fed from a longitudinal wire charging magazine 22 through longitudinal wire feeders 23 to the welding line of the grid welding machine in the direction of the arrow P. Transverse wires Q are fed to the welding line from the exit side of the welding machine from storage magazines, not shown, through at least one upper transverse wire feeder 24 or through at least one lower transverse wire feeder 25, or from both the upper and the lower transverse wire feeders 24 and 25 into contact with a transverse wire stop 26, which is constructed as holding magnet in order to fix the transverse wires Q in the welding position. The upper transverse wire feeder 24 guides the transverse wire Q by gravity and optionally by means of additional mechanical feeding elements. The lower transverse wire feeder 25 consists in the example shown of a driven transverse wire transport chain 25", directing and guiding elements 25''' and an air feeder 25' which transports the transverse wires Q pneumatically counter to gravity as far as the transverse wire stop. Transverse wire feeders of this type are known per se and therefore require no detailed explanation; they permit the feeding of transverse wires of different diameter and different length.

The upper electrode beam 17 is guided in a vertical roller guideway 27 and is set in corresponding stroke movements in the rhythm of the welding machine by means of an eccentric 28 which is driven by a drive means 29 in order to lift the upper electrode holder 16 with the associated welding electrodes 8 sufficiently each time to permit the upper transverse wire Q to be fed to the welding line unobstructed in the highest position of the electrodes. In the lowest position of the electrodes the position of the longitudinal wires L and transverse wires Q is accurately defined for welding together. The electrodes 7 below the welding plane are preferably also lowered by a predetermined amount simultaneously with the raising of the upper electrodes 8, in order to obtain a sufficient opening of the electrode gap.

In the retracted position of each hydraulic cylinder 11 the lower electrode holder 9 is lowered correspondingly in order to permit the feeding of a lower transverse wire Q. By controlling the hydraulic cylinder during the extension, the welding pressure is adjusted to correspond to the diameters of the wires to be welded. The hydraulic valve 14 also controls the cylinder 11 in the operating rhythm of the welding machine.

In the case of so-called single spot welding, as FIGS. 3a and 3b show, the electrical connection between the upper electrode holder 16 and the corresponding bus-bar 2 for each electrode pair 7, 8 which cooperates in the welding consists of a current collector 5, a current strap 21 and a rigid connecting piece 20.

In order to perform so-called double spot welding and to produce grids from prefabricated wire or sheet metal frames and longitudinal wires or longitudinal and transverse wires, according to FIGS. 4a and 4b all the current straps 21 and connecting pieces 20 are removed and each two adjacent upper electrode holders 16, 16' are then connected by a current bridge 30. Said current bridge 30 exhibits corresponding slots to enable the mutual interval of the upper electrode holders 16 to be adapted to the desired pitch of the longitudinal wires.

In the case of single spot welding the electrical connection between the lower electrode holder 9, or the lower welding electrode 7, and the bus-bar 2 consists of an associated current collector 6 and a flexible current strap 10.

In order to perform double spot welding one at a time of the two lower electrode holders 9, 9' remains connected by a current strap 10 to an associated current collector 6 as for single spot welding, whereas the current strap 10' of the associated adjacent lower electrode holder 9' is detached from the current collector 6 like pole which is associated in the case of single spot welding and is repositioned on the current collector 5 of opposite pole.

The current collectors 5, 6 are connected to the bus-bars 2 by slides 31, which permits the poles of the current collectors to be reversed. Each slide 31 consists substantially of contact pieces 31', an electrically insulated connecting piece 31'' and an actuating element 31'''.

In order to vary the pitch of the longitudinal wires, according to FIG. 1 the upper electrode holder 16 is lifted by means of the clamping beam 18 movable in the vertical direction, and the upper electrode 8 rests upon the associated lower electrode 7. The upper electrode holder 16 is then connected by a coupling element 32, a centering pin for example, through the connecting piece 20 to the lower electrode holder 9. As a result of this coupling and of the frictional engagement, the two electrode holders 9, 16 are connected sufficiently to each other to be capable of transport in common. In order to transport the mutually connected electrode holders 9, 16, an element 33 which clamps the slide 31 firmly to the bus-bar 2 is released. The transport of the two electrode holders 9, 16 is effected through the transporter device which consists of the slide rail 15, the guide rail 13 and the stirrup 12 with the rollers 13'.

For reasons of space and to enable the electrode holders 9, 16 to be aligned as closely as possible to one another, adjacent electrode holders are staggered mutually and mounted on two parallel rails 13, as indicated by dash lines. The slide rail 15 is connected firmly to the upright 34 of the machine frame, which is in turn supported in a manner not shown by the frame 1 and by the base plate of the machine.

The welded grid is conveyed out of the welding line by extractor hooks 35. For the basic adjustment of the upper electrode holders 16 the upper electrode beam 17 can be adjusted in height by means of an eccentric approach device 36. As already mentioned, the upper electrode beam 17 is also raisable by means of the further eccentric 28 and of an associated drive device 29 at each feed step of the grid welding machine, namely far enough for a correct feed of the transverse wires Q to the welding line to be ensured even for a close pitch of the transverse wires, whilst the lower electrodes 7 can be lowered simultaneously by a certain amount by means of the hydraulic cylinders 11.

In the example illustrated the welding machine is equipped with a magazine 22 for longitudinal wires cut to length. This magazine can be replaced in the context of the intention by a magazine, not shown, for prepared frames, for example wire frames or flat sheet metal frames or profile frames, the frames serving for welding of transverse wires to produce frame grids for rubble cages, fences etc., or to produce bar grates for refrigerators etc. Narrow grids or bar grates particularly can be produced with the machine according to the invention. It is also possible to feed frames already welded to a group of wires. Two or more magazines for longitudinal wires and/or frames may also be provided in the transverse direction of the machine, so that a two-path or multiple-path production of the same or different grids is also possible.

We claim:

1. An electrical resistance spot welding machine for single or double spot welding, for producing grids or bar grates, comprising
    means for defining a welding plane and for advancing work material in a longitudinal direction in said plane;
    rows of first and second electrodes on respective ones of first and second opposite sides of said plane, said rows extending parallel to said plane in a direction transverse to said longitudinal direction;
    at least one welding transformer on said first side of said plane;
    first electrically conductive removable connections from a first output terminal of said welding transformer to said first row of electrodes;
    second electrically conductive removable connections, passing through said plane, from a second output terminal of said welding transformer to said second row of electrodes, and
    removable current bridges sized to electrically connect selective pairs of said second electrodes,
    wherein for single spot welding, opposing first and second electrodes are respectively connected to said first and second terminals of said welding transformer by said first and second electrically conductive removable connectors, and
    wherein for double spot welding, said selective pairs of second electrodes are electrically connected to each other by means of said current bridges, and each electrode of selective opposing pairs of said first electrodes is respectively connected to said first and second terminals of said welding transformer.

2. A machine according to claim 1, further comprising electrode holders; means enabling said electrode holders to slide to vary the pitch thereof in said transverse direction; means for mechanically coupling each pair of electrode holders which support a complementary pair of said first and second electrodes for common sliding adjustment.

3. A machine according to claim 2, wherein said mechanical coupling means comprises means for lowering said second electrode of said pair onto said first electrode thereof to provide a frictional engagement.

4. A machine according to claim 2, wherein said mechanical coupling means comprises a removable connecting piece.

5. A machine according to claim 2, further comprising at least one transverse rail transportably mounting said electrode holders for one of said rows of electrodes.

6. A machine according to claim 5, wherein there are two parallel ones of said rails, adjacent ones of said electrode holders being transportable on different ones of said rails.

7. A machine according to claim 1, wherein said removable electrically conductive connections comprise rigid removable connecting pieces each connected to a respective one of said second electrodes and through a flexible conductor to an associated current collector of a bus bar.

8. A machine according to claim 7, wherein aid first electrodes are each connectable by means of a flexible conductor to an associated current collector of a bus bar.

9. A machine according to claim 8, wherein after said connecting pieces have been removed, each of said first electrodes is connectable by means of said flexible conductor thereof to a current collector of a bus bar which is, during single spot welding, associated with an adjacent one of said first electrodes.

10. A machine according to claim 1, wherein all of said second electrodes are adjustable perpendicular to said plane to adjust the gap between complementary pairs of said electrodes, and all said first electrodes are adjustable perpendicular to said welding plane for opening the welding gap between adjacent complementary pairs of said electrodes and to generate welding pressure therebetween.

11. A machine according to claim 10, wherein said welding plane is substantially horizontal; said welding transformer and bus bars associated therewith are arranged below said plane; and an electrode retaining beams supporting said second electrodes is vertically adjustable to accomodate work material thickness.

12. A machine according to claim 11, further comprising an eccentric drive connected to said electrode retaining beam to provide said vertical adjustment.

13. A machine according to claim 11, further comprising means for raising said electrode retaining beam at a feed step of said machine after each welding operation.

14. A machine according to claim 13, further comprising means for lowering said first electrodes simultaneously wwith raising of said second electrodes.

15. A machine according to claim 10, further comprising hydraulic cylinders associated with respective ones of said first electrodes for adjustment thereof.

16. A machine according to claim 1, further comprising at least one magazine for work material selected from the group consisting of longitudinal wires cut to length and prepared frames.

* * * * *